July 11, 1961 J. T. WARKOCZEWSKI 2,991,519
MOLD FOR FORMING FINELY PERFORATED RINGS
Filed March 11, 1959 3 Sheets-Sheet 1

INVENTOR.
Joseph T. Warkoczewski
BY
ATTORNEY.

July 11, 1961 J. T. WARKOCZEWSKI 2,991,519
MOLD FOR FORMING FINELY PERFORATED RINGS
Filed March 11, 1959 3 Sheets-Sheet 2
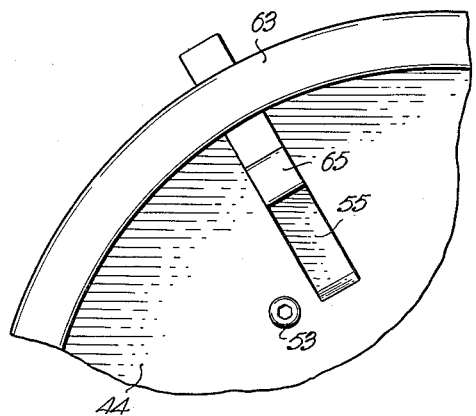
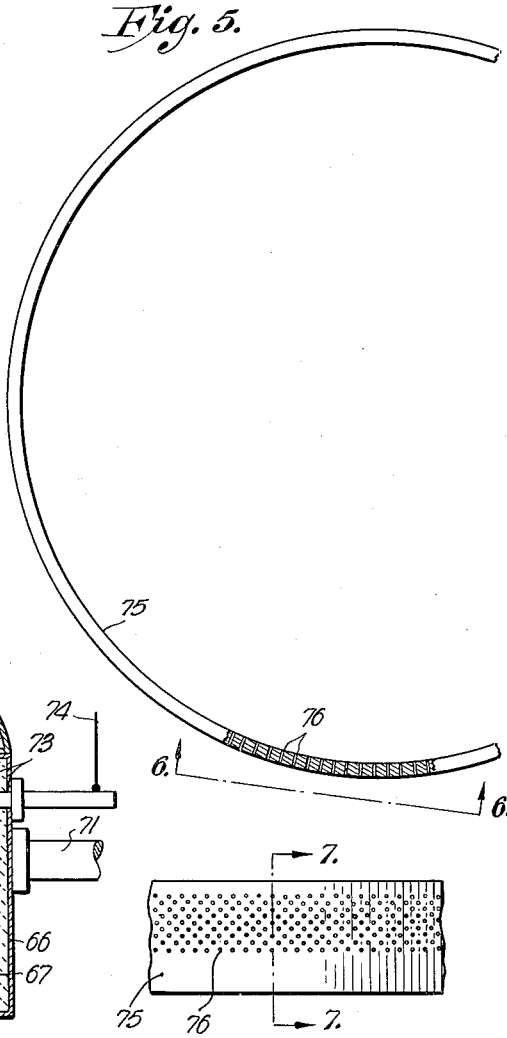
INVENTOR.
Joseph T. Warkoczewski
BY
ATTORNEY.

July 11, 1961  J. T. WARKOCZEWSKI  2,991,519
MOLD FOR FORMING FINELY PERFORATED RINGS
Filed March 11, 1959  3 Sheets-Sheet 3

INVENTOR.
Joseph T. Warkoczewski
BY
ATTORNEY.

United States Patent Office 2,991,519
Patented July 11, 1961

2,991,519
MOLD FOR FORMING FINELY PERFORATED RINGS

Joseph T. Warkoczewski, Kansas City, Mo., assignor to Gustin-Bacon Manufacturing Company, a corporation of Missouri
Filed Mar. 11, 1959, Ser. No. 798,772
4 Claims. (Cl. 22—113.5)

This invention relates to apparatus for forming or centrifugally casting finely perforated rings employed in the production of very fine diameter glass fibers and refers more particularly to a centrifugal mold for such purpose.

This application is a continuation-in-part of my application Serial No. 721,491, filed March 14, 1958, entitled "Methods and Apparatus for Forming Finely Perforated Rings."

Apparatus and processes for forming fine diameter glass fibers wherein molten glass is forced through fine diameter perforations in metal rings and the glass streams issuing from the periphery of the ring are attenuated by a high temperature gas blast, or the like, are well known. In this art, the life of such rings and the perforations therein are measured in relatively short periods, ranging from, typically, ten to one hundred hours. As such operations and processes are generally carried on at temperatures in the vicinity of 2000° F. with the rings rotating at velocities well over 2000 r.p.m., it is evident that the materials of which the rings are formed must have extremely high tensile strength at elevated temperatures. Additionally, it is necessary that the holes in the rings have internal diameters well below thirty thousandths of an inch. Such holes optimally would have uniform, perfectly round orifices and square edges at the surfaces of the rings. The production of such rings in sufficient numbers, in relatively short times at a low cost and with the desired characteristics, is a severe problem in the art.

The art has provided several methods of fabricating such rings. One such procedure employs a plurality of relatively small electric arcs which burn the holes through the metal of the ring. This process suffers from defects of excessive expense, tapering of the hole bores rather than the uniform diameter thereof, and a lack of smoothness within the holes. A second conventional art process involves individually drilling each hole in the ring, employing fine drills. To date, the time required to drill the number of holes desired (for example, 2600 per ring) and the expense of the resultant rings has made this method also impractical. The necessary qualities of the metal used in the rings causes an extremely high mortality rate of the drill elements. Additionally, some of the preferred alloys used in fabricating such rings rapidly work harden.

My application Serial No. 721,491, supra, disclosed a method of casting such rings and a mold utilizable in such casting which solved many problems. However, a number of critical problems limited the life and usefulness of such molds to a lesser period than was desired. Additionally, a number of more or less capricious factors repeatedly intervened in the operation of such molds to make the casting of such finely perforated rings, while feasible, too unpredictable for the expense involved.

Therefore, in addition to providing apparatus to cast metal rings to accomplish all of the objects of my previous application, supra, my new mold additionally seeks to provide additional crucial advantages and objects as follows.

An object of the invention is to provide a mold for casting finely perforated rings wherein the core carrying flange or ring is able to expand and contract as desired, yet be retained in position within the mold and position the mold cores accurately in the molding process.

Still another object of the invention is to provide a mold for casting centrifugally finely perforated rings with high melting point, high tensile strength metal, the core holding flange or ring able to contract or expand under conditions of extreme heat and heat shock, yet so received in the mold as to prevent the fluid metal from inserting itself between the flange and the mold, thus preventing the freeing of the cast ring from the core holding flange or ring.

Another object of the invention is to provide a pouring insert which is replaceable, if desired, which can readily be cleaned by machining of metal adhered thereto, and which sufficiently slows up the motion of the poured metal in the centrifugal casting process out to the cores whereby to prevent breakage and damage of the low rows of cores, while avoiding excessive adherence of poured casting metal thereto.

Yet another object of the invention is to provide a mold or mold assembly for centrifugal casting of finely perforated rings under extreme conditions of temperature and speed of rotation which is completely safe during the pouring process and does not offer any hazard whatsoever of centrifugal throw-off of parts of the mold, yet which may be readily disassembled after the casting process.

Other and further objects of the invention will appear in the course of the following description thereof.

In the drawings, which form a part of the instant specification and are to be read in conjunction therewith, embodiments of the invention are shown, and in the various views, like numerals are employed to indicate like parts.

FIG. 3 is a bottom view of a portion of the mold of FIG. 1.

FIG. 4 is a side-sectional view of a typical furnace adapted for use in practicing the invention.

FIG. 5 is a plan view of a ring cast by the inventive process with a portion thereof cut away.

FIG. 6 is a view taken along the lines 6—6 of FIG. 5 in the direction of the arrows.

FIG. 7 is a view taken along the lines 7—7 of FIG. 6 in the direction of the arrows.

Figure 8:
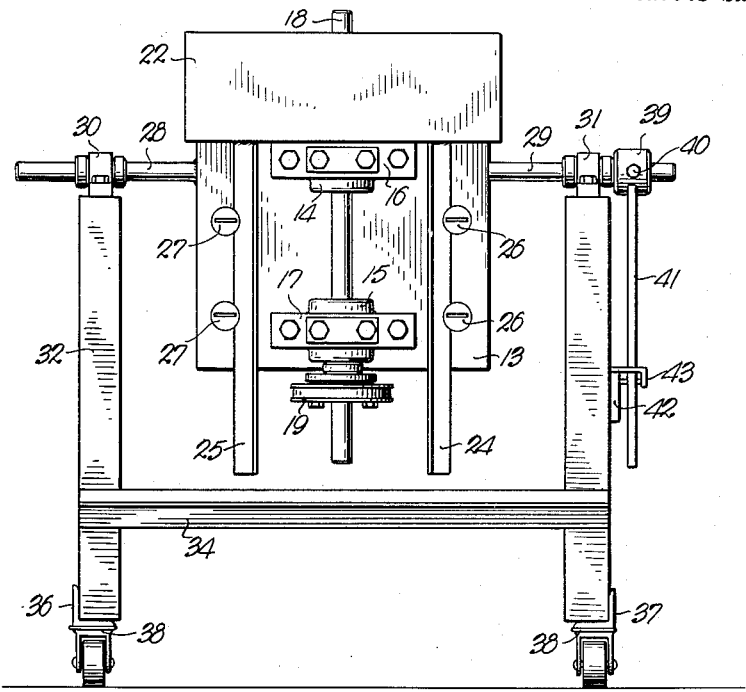
FIG. 8 is an end view of an apparatus adapted to spin the mold of FIGS. 1 and 2 in the inventive casting process.
Figure 9:
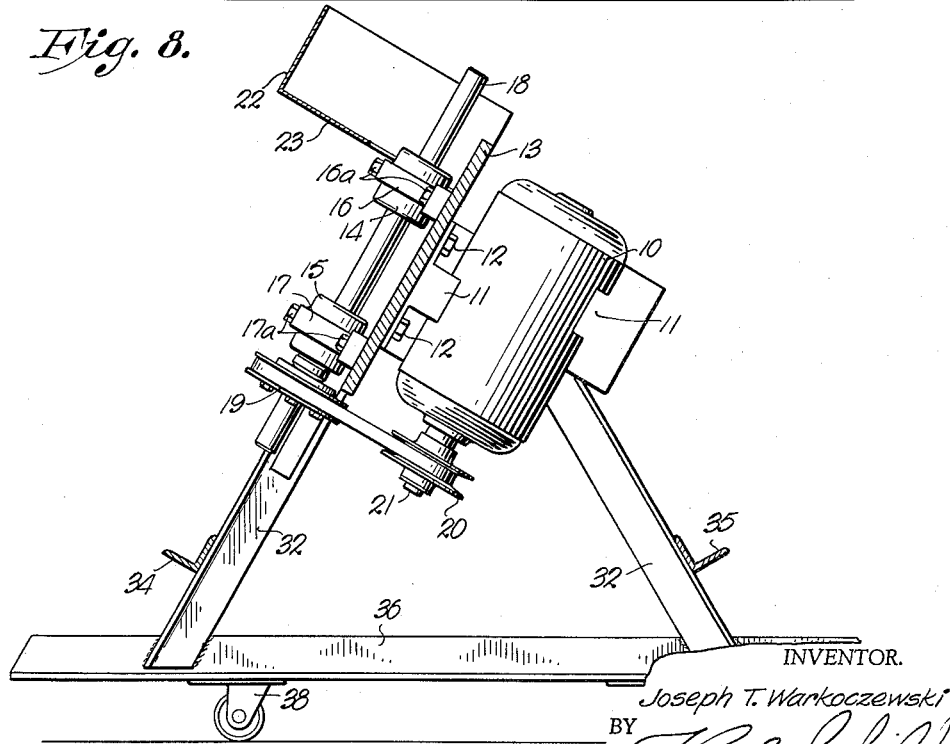
FIG. 9 is a side view of the apparatus of FIG. 8.

Referring first to FIGS. 8 and 9, therein is shown apparatus for mounting and rotating a centrifugal casting mold embodying the invention. A typical power source such as an electric motor 10 is fixed by a rigid mounting 11 and bolts 12 to the underside of mounting plate 13. Bearings 14 and 15 are fixed by clamps 16 and 17 and bolts 16a and 17a to the mounting plate 13. A shaft 18 is rotatably mounted in the bearings 14 and 15 and has pulley 19 fixed thereto below the lower edge of plate 13 and bearing 15. Pulley 20 is fixed to shaft 21 driven by motor 10. Hemispherical shield 22 having bottom plate 23 is fixed to slide angles 24 and 25 which are controlled on the plate 13 by clamps 26 and 27, whereby to adjust the position of plate 23 and shield 22 relative the upper end of shaft 18. Shafts 28 and 29 are fastened at their inward ends by welding or other conventional means to plate 13 and are received in bearings 30 and 31 at the apex of triangular frame members 32 and 33. Bars 34 and 35 brace the front and rear members 32 and 33 to one another. The lower ends of members 32 and 33 are received in angle irons 36 and 37 having casters 38 thereon.

The mold (to be described) may be mounted on the upper end of shaft 18 and then rotated to the desired velocity for the centrifugal pouring operation. FIG. 8 shows the apparatus in loading position to permit the fitting downward of the mold on shaft 18, which is in the vertical position, while FIG. 9 shows the apparatus in pouring position with shaft 18 angled from the vertical. A collar 39 is fixed to the outer end of shaft 29 by set screw 40 and has lever arm 41 attached thereto. Beam or bar 42 extends between the outer surfaces of members 33 and has removable catch pins 43 insertable therein to alternatively lock the lever arm in the position of FIG. 8 or FIG. 9.

Figure 1:
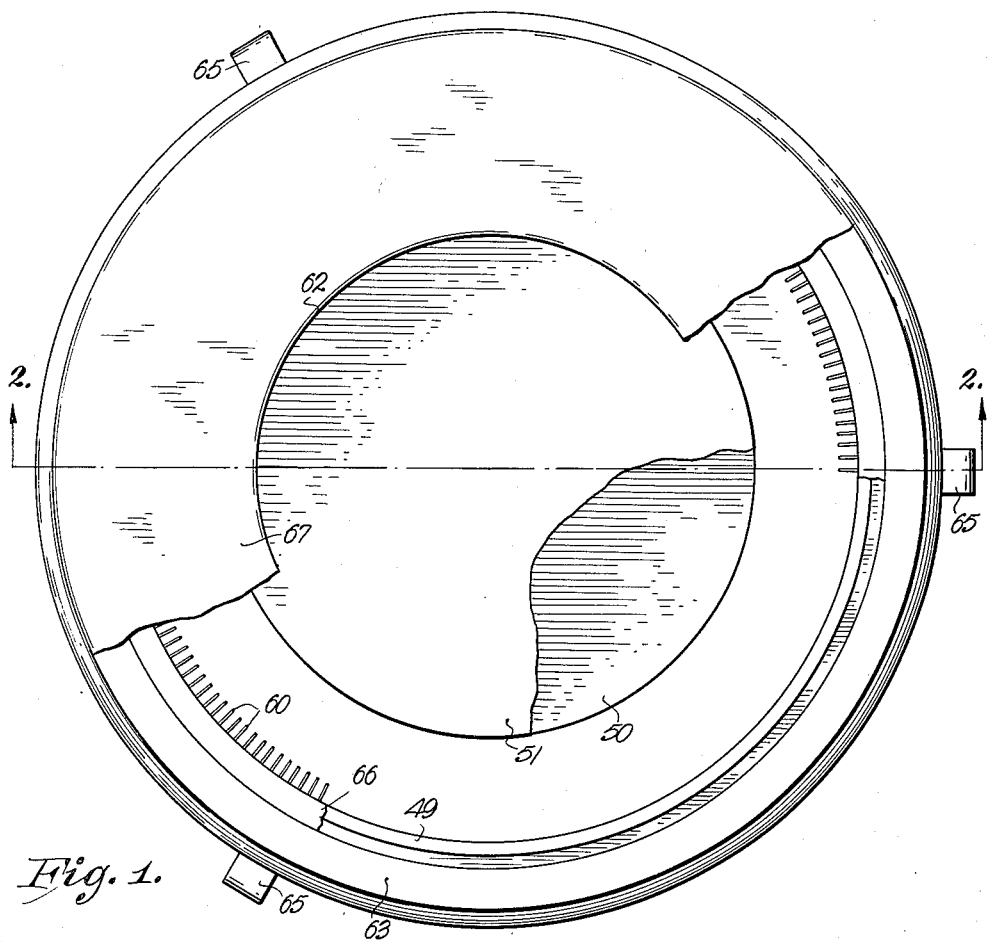
FIG. 1 is a plan view with parts cut away of a rotatable mold embodying the invention.
Figure 2:
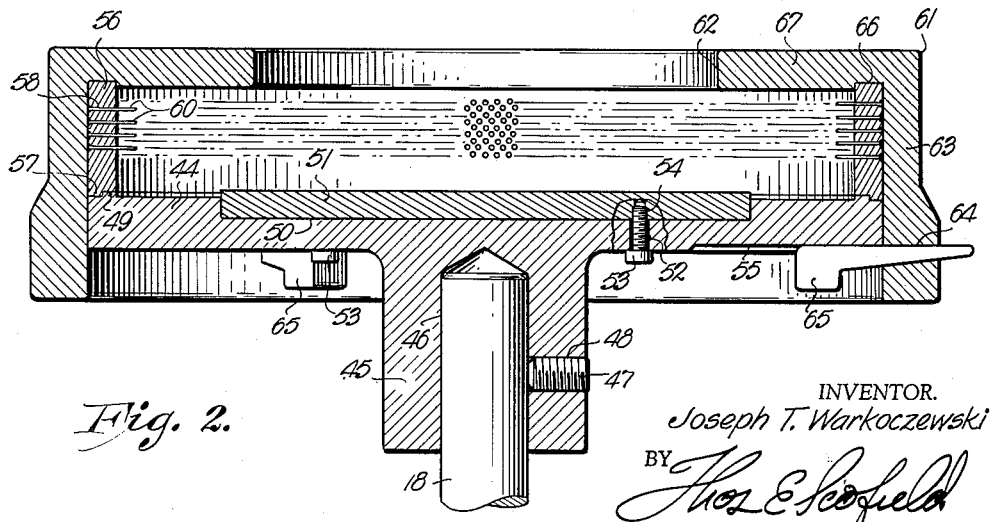
FIG. 2 is a view of the mold of FIG. 1 taken along the lines 2—2 of FIG. 1 in the direction of the arrows.

Turning to FIGS. 1 and 2, therein is shown in detail the parts of the centrifugal casting mold itself. Base plate 44 may be formed of cast iron or like material and has base plug 45 centrally thereof with socket 46 formed therein. Set screw 47 is threaded into opening 48 to grip the base plug 45 upon shaft 18. Plate 44 is circular in plan view and has circumferential raised flange 49 thereon. Recess 50, preferably circular in form, receives pouring insert of cold rolled steel 51 therein, said insert of slightly greater height than the depth of the recess 50. Openings 52 are formed through the underside of plate 44 to receive bolts 53 which thread into openings 54 in the underside of the insert 51. Grooves 55 are spaced around the underside of the plate 44 for a purpose to be described.

Casting ring or flange 56 is circular in plan view and has a depending flange 57 to fit behind the raised flange 49 on plate 44. The thickness of ring 56 is equal to the distance from the outer edge of plate 44 to the inner edge of flange 49. The outer diameter of the ring 56 is preferably substantially that of the base plate 44. Ring 56 is formed of cast iron or like metal. A plurality of relatively fine diameter holes 58 are formed through ring 56. Ring 56 is preferably but not necessarily mounted at right angles to or normal to base plate 44, but holes 58 are necessarily radial to the axis of the shaft 18 and base plate 44. Openings 58 are preferably countersunk as shown at 59 on the outer face of ring 56. A plurality of frangible leads or elements 60 having an outer diameter substantially equal to the inner diameter of openings 58 in ring 56 or only slightly less than said inner diameter may be mounted within said openings or holes 58 so as to extend radially into the cavity of the mold formed by ring 56 mounted on base plate 44. Openings 58 in flange or ring 56 are preferably of uniform inside diameter and have uniform diameter openings into and out of the inside and outside faces of flange or ring 56, except for the countersunk portions thereof.

Cap 61 has a preferably circular central opening 62 of pour plate 51. Side wall 63 of cap 61 fits down over the entire ring 56 and extends below, at least in portions thereof, the lower face of plate 44. Openings 64 extend through the side wall 63 in the area below the bottom plate 44 and are preferably tapered from a greater thickness inwardly to a lesser thickness outwardly. The openings 64 are spaced circumferentially of the side 63 whereby to be opposite grooves 55 and permit the insertion of pins 65 which are preferably tapered to match the openings 64. A circumferential groove 66 is formed in the underside of the peripheral portion of the top 67 of cap 61 to receive the upper portion of ring 56 therein.

The frangible elements 60 employed as cores in the mold are preferably trimmed to a uniform length so as to extend centrally of the mold cavity a uniform distance as is seen in FIG. 1. As it is desired to cast rings with perforations of the smallest possible diameter, the outer diameters of the frangible elements 60 are as small as possible. A typical outer diameter of an element 60 employed is .025 inch. The clearance between the outer surface of the elements 60 and the inner surfaces of openings 58 should be as small as possible to get relatively secure positioning of the frangible elements in the mold, for example, .002 inch maximum clearance. This clearance, however, must not be too small to prevent insertion of the leads into the mold from the outside. If the clearance is too close, the liklihood of breakage of the elements in insertion is too great. A typical inward extension of the elements into the mold would be $10\!/\!_{34}$ or .200 inch. The inward extension of the frangible elements into the mold, their outer diameter, etc., are somewhat variable. However, it should be kept in mind that the glass fibers desired to be produced in the production processes earlier mentioned are of the order of 4 or 5 microns (after gas attenuation) after extrusion through the holes in the cast rings. The composition of the frangible elements may vary but a typical successful composition is a mixture of graphite and clay, such as is in ordinary pencil leads. This mixture is preferably such as to obtain the maximum shear strength.

A typical mixture of graphite and clay would be 45 percent clay and 55 percent graphite. In a preferred form of the clay, 70 percent of a firing clay would be employed, 20 percent of a molding clay and 10 percent of a binding clay would be employed. Each of the three clays employed would be processed through a purification process. For the 55 percent graphite, three types are generally employed in a ratio of approximately 33⅓ percent of each. The types are high carbon content of Mexican amorphous, Ceylon flake and Domestic flake graphite. These terms are ones well known in the art. The method of mixing is by use of water. However, as all of these raw materials are mined, some adjustment must be made from time to time in these varying ratios. The above example is not intended to be limiting but merely as a typical usable example of a composition of a frangible element. Such a lead stick sample which would be inserted into a device holding it at approximately correct writing angle would break under approximately 3.25 ounces of pressure applied to the lead through the holding device. Again, this test is merely given as an example and an illustration, not a limiting statement.

A typical alloy composition for centrifugal casting in a mold as previously described would be chromium 20.5 to 23 percent; iron 17 to 20 percent; molybdenum 8 to 10 percent; cobalt .5 to 2.5 percent; tungsten .20 to 1.0 percent; carbon .05 to .15 percent; silicon 1 percent; manganese 1 percent, and the balance nickel. Such an alloy has a desired high temperature and high tensile strength characteristics required in the glass fiber production process previously delineated.

Referring now to FIG. 4, therein is shown a typical, conventional, small electric furnace operable to melt an alloy such as that immediately previously described and from which the alloy may be poured into the mold in the centrifugal casting process. Outer shell 66 is lined with refractory material 67, the latter defining furnace cavity 68. The cap for the furnace has outer shell 69 with inner refractory lining 70. Handles 71 are fixed to the outer shell of the furnace. Carbon electrodes 72 extend through openings 73 in the shell and refractory lining 67 of the furnace and have electrical leads 74 thereto.

FIG. 5 shows a typical finished cast ring 75 having a plurality of openings 76 formed therein. The spacing of the openings 76 in the ring is preferably that of an equilateral triangle, as shown in FIG. 6. To achieve this spacing, the openings 58 in the ring 56 of the mold must be spaced in such manner, as well. FIG. 7 shows a cross section through the ring illustrating the preferred form of the opening 76, that is, of uniform diameter, with square faces. The showings of FIGS. 5–7, inclusive, are of a finished ring, after pouring, removal from the mold and machining.

In the practice of the inventive method, the cores 60, if not already of uniform length and of the desired length, are sheared to both in an apparatus such as is shown in my application Serial No. 778,896 filed December 8, 1958, entitled "Core Shearing Device." They are then placed in the openings 58 in the ring 56 extending interiorly of the mold cavity. This process may be done by hand but is preferably assisted by a device such as that shown in my application Serial No. 780,384, filed December 15, 1958, entitled "Mold Core Loading Device." The cap 61 is then fitted over the ring 56 and the keys 65 pressed through grooves 55 into openings 64 to lock the cap in place on the mold. The mold is then placed on the shaft 18 of the spinning device in the vertical position of FIG. 8. This prevents the mold cores falling into the center of the mold under the effect of gravity. Power source 10 is then started and rotation of the mold with the core elements 60 therein is begun.

A parting agent may then be applied to the base plate 44 and the pour plate 51, if desired, whereby to facilitate removal of the cast ring from the mold after cooling thereof. A typical operable parting agent would be carbon black, applied as shown in my application Serial No. 721,491, supra, with an oxyacetylene torch running under low oxygen. Said carbon also serves as a heat conducting agent. The parting agent may be applied to the frangible elements 60, as well. The mold is then preferably preheated (not shown) with a blow torch or the like applied to the periphery theerof to avoid chilling of the molten metal when poured therein. Employing the alloy previously described, a typical preheat temperature would be 1100° F. The preheat preferably should not surpass by far, and is preferably under, the core destruction temperature. The mold is preferably brought up to speed in a horizontal position and then may be tilted as shown in the position of FIG. 9, if desired. The application of the parting agent and the preheating may be done either in the horizontal position as in FIG. 8 or in the tilted position as in FIG. 9.

The pouring of the metal may be accomplished in the horizontal position, but is preferably done in the tilted position of FIG. 9. A metal of the character described, melted in the furnace as shown in FIG. 4, may be poured into the mold centrally of the pour plate 51 and peripheral of the center thereof. Opening 62 in the cap 61 must be of sufficient diameter to permit pouring to the position described. A typical rotation rate for the mold during the pouring operation is 1200 r.p.m.

The metal moves out immediately to the periphery of the mold and up the flange or ring 56 among the frangible cores 60. The spinning of the mold is then continued for any desired solidifying period. The rotation of the mold is then stopped and cooling of the ring permitted for a desired period to permit convenient handling, for example, fifteen minutes or more. Preferably, then, the connection between the cores and the cast ring in the mold are broken by passing a sharp object such as a knife peripherally of the ring between the ring and the mold ring 56. The cast ring in cooling shrinks away from the mold ring 56 sufficiently to permit this operation. It may then be pulled or otherwise forced out of the mold. The frangible cores 60 may then be punched or drilled out individually from openings 76. Ring 75 may or may not be cast of extra thickness to permit machining of either or both the inner and outer surfaces of the ring to control the thickness of the ring or the surface characteristic thereof. Typical thicknesses of a cast ring may range from .085 inch to .150 inch, after machining.

I have discovered that the cold rolled steel plate 51 minimizes the adherence of the poured metal to the plate 51. Also, this metal may be easily machined to return to true. Preferably, also, the height of the plate 51 is slightly above the upper face of the plate 44. By permitting a uniform, yet not locked engagement between the ring 56 and the plate 44 as well as with the cap 61, I permit expansion and contraction of the ring 56 in a uniform manner, within its confinement in the mold. Keys 65 obviate any possibility whatsoever of the cap coming off at high temperatures.

From the foregoing, it will be seen that this invention is one well adapted to attain all of the ends and objects hereinabove set forth together with other advantages which are inherent to the methods and apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter hereinabove set forth or shown in the accompanying drawings is to be interpreted as illustrative and not in a limiting sense.

Having thus described my invention, I claim:

1. A centrifugal casting mold for forming finely perforated rings comprising a base plate at least substantially circular in form, a peripheral flange separate from said base plate positioned on said base plate at a substantial angle thereto forming a mold cavity centrally thereof, a plurality of relatively small diameter openings extending through said flange, means for rotating said base plate around the central axis thereof attached thereto, an integral cap for said flange on said base plate circumferentially overlying the top edge of said flange and having a side wall circumferentially extending downwardly peripherally of said flange whereby to abut against and cover said openings, said cap extending past the lower edge of said base plate at a plurality of points, said plurality of extensions having openings therethrough, and removable keys in said extension openings to lock the cap on said mold, the openings and keys tapering from a greater inner thickness to a lesser outer thickness.

2. A centrifugal casting mold as in claim 1 wherein the openings extending through said flange of fine diameter are counterbored on the peripheral ends thereof to enlarge the entrances thereinto on the outer surface of said flange.

3. Apparatus as in claim 1 wherein the periphery of the base plate has a circumferential recess therein to receive at least a portion of the lower edge of said flange, and the inside upper surface of the cap has a circumferential recess therein to receive at least a portion of the upper edge of said flange.

4. Apparatus as in claim 3 wherein the circumferential recess in the inside upper surface of the cap is so formed as to receive the entire upper edge of said flange.

References Cited in the file of this patent

UNITED STATES PATENTS

| | | |
|---|---|---|
| 1,038,682 | Thompson | Sept. 17, 1912 |
| 2,042,015 | Moormann | May 26, 1936 |
| 2,666,952 | Lawson et al. | Jan. 26, 1954 |
| 2,839,802 | Bean et al. | June 24, 1958 |

FOREIGN PATENTS

| | | |
|---|---|---|
| 626,041 | Great Britain | July 7, 1949 |
| 642,611 | Great Britain | Sept. 6, 1950 |